(12) United States Patent
Kojima

(10) Patent No.: US 8,200,080 B2
(45) Date of Patent: Jun. 12, 2012

(54) IMAGE SENSING APPARATUS AND EXPOSURE CONTROL METHOD

(75) Inventor: Teruyuki Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/860,269

(22) Filed: Aug. 20, 2010

(65) Prior Publication Data

US 2011/0052174 A1 Mar. 3, 2011

(30) Foreign Application Priority Data

Aug. 31, 2009 (JP) ................................. 2009-201088

(51) Int. Cl.
*G03B 3/10* (2006.01)
*G03B 7/08* (2006.01)

(52) U.S. Cl. .................... 396/121; 396/213; 396/234

(58) Field of Classification Search .......... 396/121–122, 396/213, 227, 233–234
See application file for complete search history.

(56) References Cited

U.S. PATENT DOCUMENTS

| | | |
|---|---|---|
| 5,313,246 A | 5/1994 | Takagi et al. |
| 6,625,398 B1 * | 9/2003 | Nonaka .......................... 396/121 |
| 2009/0322885 A1 * | 12/2009 | Ogasawara et al. ........... 348/169 |
| 2010/0290773 A1 * | 11/2010 | Ichimiya ....................... 396/111 |
| 2011/0052173 A1 * | 3/2011 | Yoshida ........................ 396/213 |

FOREIGN PATENT DOCUMENTS

| | | |
|---|---|---|
| JP | 3224535 | 10/2001 |
| JP | 2001-356384 | 12/2001 |

* cited by examiner

*Primary Examiner* — Christopher Mahoney
(74) *Attorney, Agent, or Firm* — Cowan, Liebowitz & Latman, P.C.

(57) ABSTRACT

An image sensing apparatus has focus state detection areas, photometry areas, a defocus amount obtaining unit that obtains a defocus amount of each focus state detection area, a photometry unit that obtains a photometric value of each photometry area, and a determination unit that determines a weighting coefficient for each photometry area. The photometry areas includes a first photometry area, corresponding to any of the focus state detection areas, for which the weighting coefficient is determined using a defocus amount of the corresponding focus state detection area, and a second photometry area for which the weighting coefficient is determined using the weighting coefficient for the first photometry area or the defocus amount of the focus state detection area corresponding to the first photometry area. The second photometry area includes one or more photometry areas, and, in a field area, the number of photometry areas below a first area for obtaining a photometric value in the first photometry area is greater than that above the first area.

17 Claims, 7 Drawing Sheets

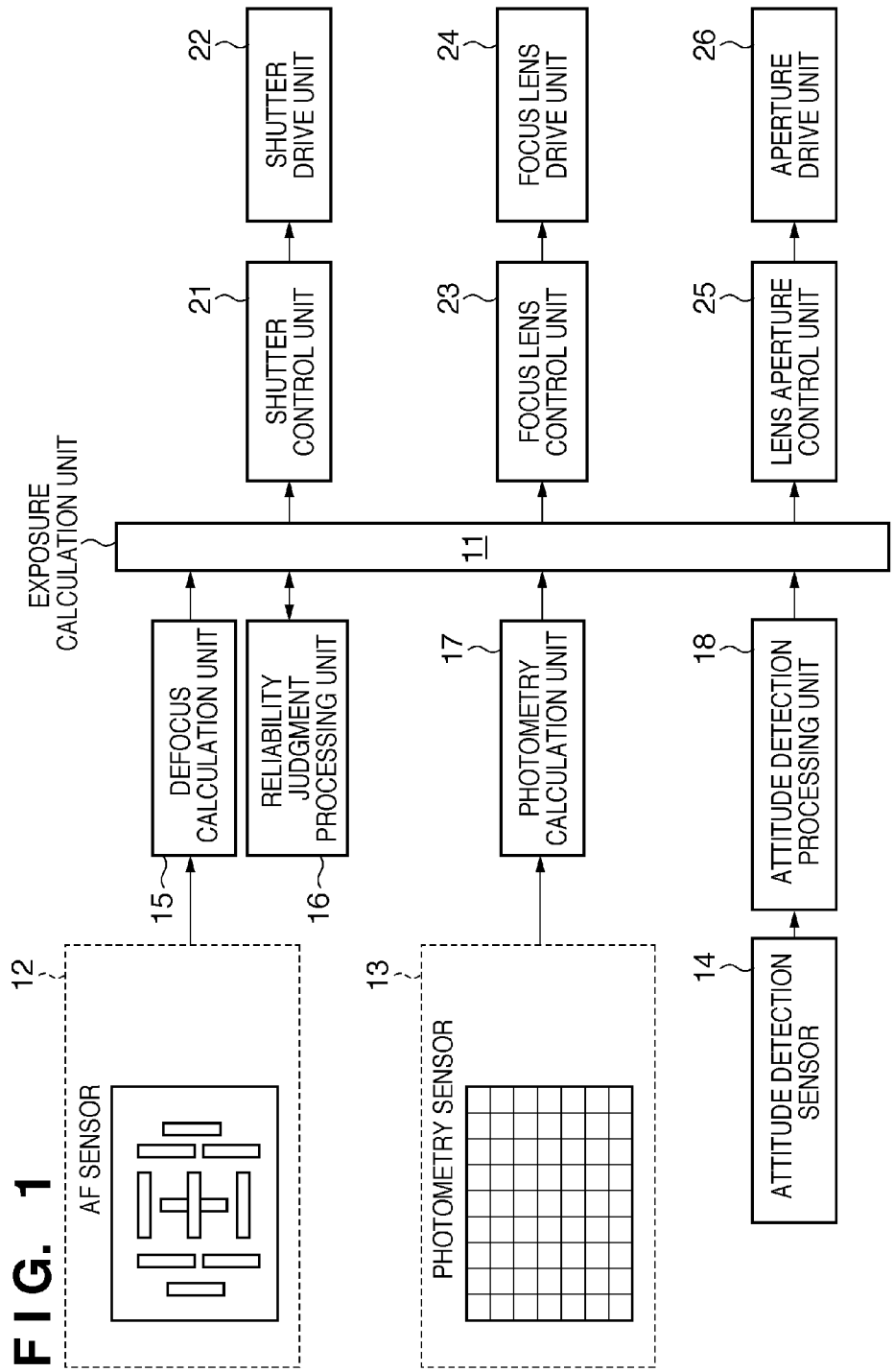

FIG. 7A

| DEFOCUS AMOUNT def_in | WEIGHTING COEFFICIENT k(i, j) |
|---|---|
| 0.5mm < def_in | 1 |
| 0.3mm < def_in ≤ 0.5mm | 1 |
| 0.15mm < def_in ≤ 0.3mm | 2 |
| 0.05mm < def_in ≤ 0.15mm | 3 |
| −0.05mm < def_in ≤ 0.05mm | 4 |
| −0.15mm < def_in ≤ −0.05mm | 3 |
| −0.3mm < def_in ≤ −0.15mm | 2 |
| −0.5mm < def_in ≤ −0.3mm | 1 |
| def_in ≤ −0.5mm | 1 |

FIG. 7B

| ATTITUDE | PHOTOMETRY AREA 1 | PHOTOMETRY AREA 2 | PHOTOMETRY AREA 3 |
|---|---|---|---|
| HORIZONTAL ATTITUDE | (x, y) | (x, y+1) | (x, y+2) |
| CLOCKWISE VERTICAL ATTITUDE | (x, y) | (x+1, y) | (x+2, y) |
| COUNTERCLOCKWISE VERTICAL ATTITUDE | (x, y) | (x−1, y) | (x−2, y) |

IMAGE SENSING APPARATUS AND EXPOSURE CONTROL METHOD

BACKGROUND OF THE INVENTION

1. Field of the Invention

The present invention relates to an image sensing apparatus and an exposure control method.

2. Description of the Related Art

Conventionally, with a photometry apparatus used in cameras and so on, weighting has been set, based on respective defocus amounts of a plurality of focus state detection areas, for photometric values obtained from a plurality of photometry sensors disposed at positions respectively corresponding to the focus state detection areas (see Japanese Patent Laid-Open No. 2001-356384, for example).

Further, Japanese Patent No. 3224535 discloses an exposure calculation apparatus that uses weighting set for each divided focus state detection area.

However, the conventional photometry apparatuses that are disclosed in Japanese Patent Laid-Open No. 2001-356384 and Japanese Patent No. 3224535 above, and that determine, according to defocus amounts of focus state detection areas, weighting for photometric values obtained from a plurality of photometry sensors disposed at corresponding positions have the following disadvantage. That is, if a plurality of photometry areas are disposed densely and a plurality of focus state detection areas are disposed sparsely, photometric values of the photometry areas corresponding to the divided focus state detection areas are regarded as more important, and thus, photometric values of photometry areas that do not correspond to the focus state detection areas have not been utilized effectively. Accordingly, a main object may not be favorably exposed although exposure suitable for main in-focus areas can be obtained.

SUMMARY OF THE INVENTION

The present invention has been made in consideration of the above situation, and allows effective utilization of photometric values obtained from photometry areas that do not correspond to focus state detection areas, thereby performing favorable exposure control.

According to the present invention, provided is an image sensing apparatus that has a plurality of focus state detection areas and a plurality of photometry areas, comprising: a defocus amount obtaining unit that obtains a defocus amount of each of the focus state detection areas; a photometry unit that obtains a photometric value of each of the photometry areas; and a determination unit that determines a weighting coefficient for each of the photometry areas, wherein the plurality of photometry areas includes a first photometry area that is disposed in a position corresponding to any of the plurality of focus state detection areas, and for which the weighting coefficient is determined using a defocus amount of the corresponding focus state detection area, and a second photometry area for which the weighting coefficient is determined, using the weighting coefficient for the first photometry area or the defocus amount of the focus state detection area corresponding to the first photometry area, and the second photometry area includes one or more photometry areas, and the number of photometry areas for obtaining photometric values in a field area that is below a first area for obtaining a photometric value in the first photometry area is greater than the number of photometry areas for obtaining photometric values in the field area that is above the first area.

According to the present invention, provided is an exposure control method for an image sensing apparatus that has a plurality of focus state detection areas and a plurality of photometry areas, the exposure control method comprising: a defocus amount obtaining step of obtaining a defocus amount of each of the focus state detection areas; a photometry step of obtaining a photometric value of each of the photometry areas; and a determination step of determining a weighting coefficient for each of the photometry areas, wherein the plurality of photometry areas includes a first photometry area that is disposed in a position corresponding to any of the plurality of focus state detection areas, and for which the weighting coefficient is determined using a defocus amount of the corresponding focus state detection area, and a second photometry area for which the weighting coefficient is determined, using the weighting coefficient for the first photometry area or the defocus amount of the focus state detection area corresponding to the first photometry area, and the second photometry area includes one or more photometry areas, and the number of photometry areas for obtaining photometric values in a field area that is below a first area for obtaining a photometric value in the first photometry area is greater than the number of photometry areas for obtaining photometric values in the field area that is above the first area.

Further features of the present invention will become apparent from the following description of exemplary embodiments with reference to the attached drawings.

BRIEF DESCRIPTION OF THE DRAWINGS

FIG. 1 is a block diagram showing a schematic configuration of an image sensing apparatus according to an embodiment of the present invention;

FIG. 7A is a diagram showing the relationship between defocus amounts and weighting coefficients; and FIG. 7B is a diagram showing the ranges of photometry areas to each of which the same weighting coefficient is applied.

DESCRIPTION OF THE EMBODIMENTS

Figure 2A:
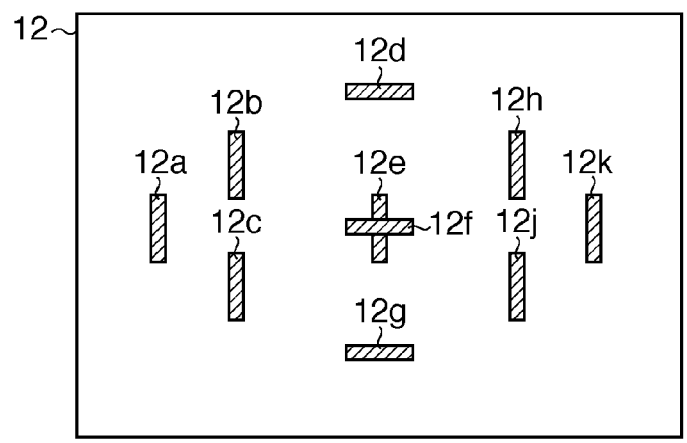
FIGS. 2A to 2C are conceptual diagrams showing the disposition relationship between focus state detection areas and photometry areas according to the embodiment.

Preferred embodiments of the present invention will be described in detail in accordance with the accompanying drawings.

FIG. 1 is a block diagram showing the configuration related to exposure control in an image sensing apparatus according to an embodiment of the present invention. The image sensing apparatus is provided with known constituent elements such as an imaging lens that is constituted detachably or integrally, an image sensor that performs photoelectric conversion on light that has entered via the imaging lens and outputs image signals, and a processing circuit that performs processing on the image signals obtained from the image sensor, which are not shown.

In FIG. 1, an AF sensor 12 has a plurality of focus state detection areas and captures image signals necessary for focus detection, each of the focus state detection areas being constituted by a pair of line sensors. A defocus calculation unit 15 calculates the defocus amount of each focus state detection area based on the image signal captured by the AF sensor 12.

A reliability judgment processing unit 16 judges the reliability of defocus amounts by referring to the defocus amounts of the focus state detection areas obtained by the defocus calculation unit 15. A focus lens control unit 23 calculates the displacement amount of a focus lens (not shown), according to the defocus amounts of the focus state detection areas whose reliability has been judged to be high, by the reliability judgment processing unit 16. Then, the focus lens control unit 23 moves the focus lens to an in-focus position based on the calculated displacement amount, by driving a focus lens drive unit 24. Note that the focus lens control unit 23 may calculate the displacement amount of the focus lens according to a focus state detection area selected by a user operating an operation unit (not shown) or the defocus amount of a focus state detection area automatically selected by the camera.

A photometry sensor 13 is a multi-division photometry sensor constituted by a plurality of divided photometry areas, and a photometry calculation unit 17 calculates a photometric value of each photometry area based on the output of the photometry sensor 13.

An exposure calculation unit 11 calculates weighting coefficients for the photometry areas based on the defocus amounts and their reliability. Note that the defocus amounts used at this time are defocus amounts after the focus lens has been moved. Then, the exposure calculation unit 11 calculates the photometric value of an entire image by performing weighted calculation (weighted average) on the photometric values of the photometry areas obtained by the photometry calculation unit 17, using the calculated weighting coefficients. Then, the exposure calculation unit 11 calculates exposure control values such as an exposure period and an aperture value, based on the photometric value of the entire image obtained by performing weighted calculation, and set values such as the ISO speed. Then, a shutter control unit 21, a shutter drive unit 22, a lens aperture control unit 25, and an aperture drive unit 26 perform exposure control based on the exposure control values determined by the exposure calculation unit 11.

An attitude detection sensor 14 is constituted by angle detection devices such as, for example, an inclination angle sensor, a horizontal detection circuit, and a gyro sensor, and an attitude detection processing unit 18 discriminates the attitude of the image sensing apparatus based on the output of the attitude detection sensor 14.

Figure 2B:
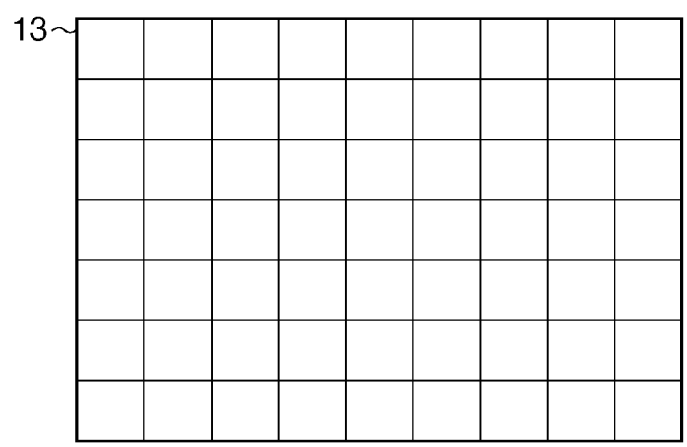
Figure 2C:
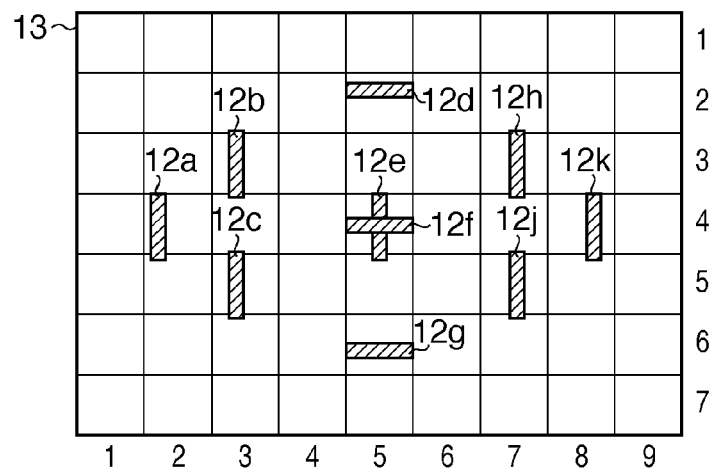

FIG. 2A is a diagram showing the disposition of focus state detection areas 12a to 12k of the AF sensor 12 shown in FIG. 1, and FIG. 2B shows a plurality of photometry areas of the photometry sensor 13, the photometry areas being obtained by dividing the photometry sensor 13 into seven equal areas in the vertical direction and nine equal areas in the horizontal direction. Hereinafter, the position of each photometry area is represented as (i, j) (i=1 to 9, j=1 to 7), assuming that i represents the horizontal position and j represents the perpendicular position. Further, FIG. 2C is a diagram showing correspondence between the focus state detection areas 12a to 12k shown in FIG. 2A and the plurality of photometry areas shown in FIG. 2B.

Figure 3:
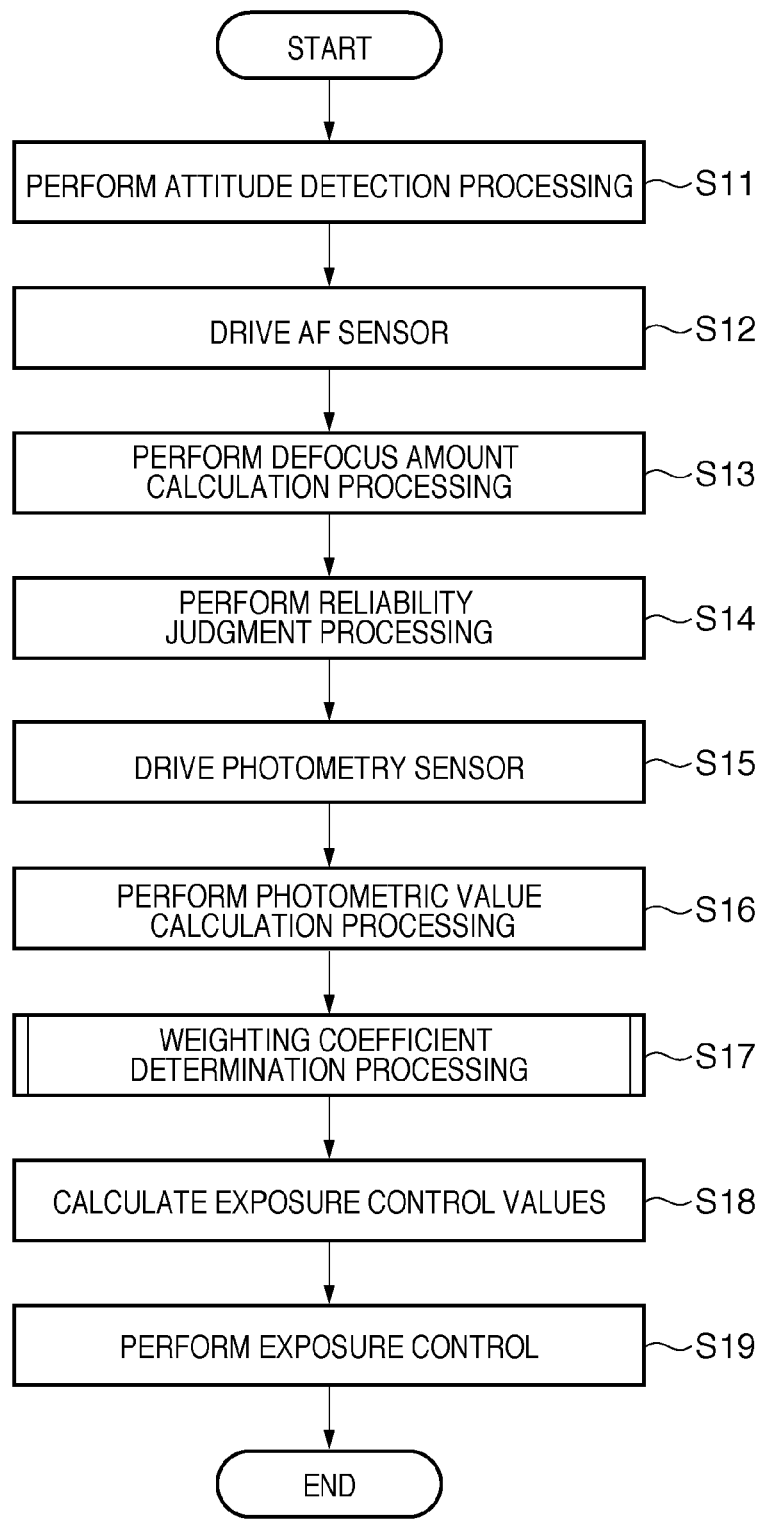
FIG. 3 is a flowchart showing a procedure of exposure control processing according to the embodiment.

Next, exposure control processing in the embodiment of the present invention is described with reference to the flowchart in FIG. 3.

First, in step S11, the attitude detection processing unit 18 discriminates whether the attitude of the image sensing apparatus is a horizontal attitude in which the bottom of the image sensing apparatus faces downward, a vertical attitude in the case where the right lateral side of the image sensing apparatus faces downward, or a vertical attitude in the case where the left lateral side of the image sensing apparatus faces downward. Note that in the description below, the vertical attitude in the case where the right lateral side of the image sensing apparatus faces downward is represented as a clockwise vertical attitude, assuming that the attitude is a vertical attitude achieved by rotating the image sensing apparatus substantially 90 degrees clockwise from the horizontal attitude. Similarly, the vertical attitude in the case where the left lateral side of the image sensing apparatus faces downward is represented as a counterclockwise vertical attitude, assuming that the attitude is a vertical attitude achieved by rotating the image sensing apparatus substantially 90 degrees counterclockwise from the horizontal attitude. In step S12, the AF sensor 12 is driven so as to obtain an image signal from each pair of line sensors that constitutes each of the focus state detection areas. Then, in step S13, the defocus calculation unit 15 calculates the defocus amount of each focus state detection area based on the corresponding image signal obtained in step S12. Subsequently, in step S14, the reliability judgment processing unit 16 judges the reliability for the defocus amount of each focus state detection area. The focus lens control unit 23 calculates the displacement amount of the focus lens based on the defocus amounts of the focus state detection areas whose reliability was judged to be high in step S14, and moves the focus lens to an in-focus position by driving the focus lens drive unit 24. Note that instead of the focus state detection areas for which reliability has been judged to be high, the displacement amount of the focus lens may be calculated according to the defocus amount of a focus state detection area selected by the user operating the operation unit (not shown) or the defocus amount of a focus state detection area that has been automatically selected by the camera.

Next, the photometry sensor 13 is driven in step S15, and the photometry calculation unit 17 calculates a photometric value of each photometry area based on the output of the photometry sensor 13 in step S16.

In step S17, the exposure calculation unit 11 determines weighting coefficients for the photometry areas, based on the photometric values of the photometry areas obtained in step S16, and the defocus amounts and their reliability of the focus state detection areas after the focus lens has been moved. Note that weighting coefficient determination processing performed here will be described later in detail.

In step S18, the photometric value of an entire image is calculated by performing weighted calculation on the photometric values of the photometry areas using the weighting coefficients for the photometry areas. Let the photometric value of each photometry area (i, j) obtained in step S16 be s(i, j) and let the weighting coefficient therefor obtained in step S17 be k(i, j), a photometric value Ea can be given by the following equation (1).

$$Ea = \frac{\left\{\sum_{j=1}^{7}\sum_{i=1}^{9}(S(i,j) \times k(i,j))\right\}}{\left\{\sum_{j=1}^{7}\sum_{i=1}^{9}k(i,j)\right\}} \quad (1)$$

Then, based on the obtained photometric value of the entire image and set values such as the ISO speed, exposure control values such as an exposure period and an aperture value are calculated.

Subsequently, in step S19, the shutter control unit 21, the shutter drive unit 22, the lens aperture control unit 25, and the aperture drive unit 26 perform exposure control based on the exposure control values determined by the exposure calculation unit 11.

First Embodiment

Figures 4A, 4B, 4C:
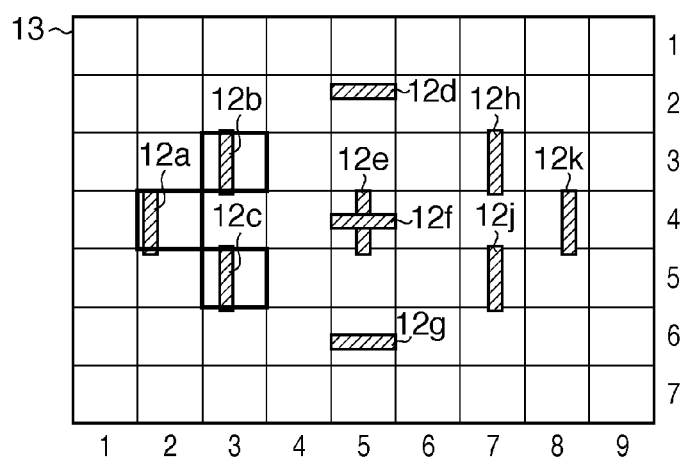
FIGS. 4A to 4C are diagrams that illustrate a procedure for determining weighting coefficients when an image sensing apparatus is in horizontal attitude, according to a first embodiment.

FIGS. 4A to 4C are diagrams that illustrate a procedure for determining weighting coefficients performed in step S17 in the case where the attitude of an image sensing apparatus is the horizontal attitude, according to a first embodiment of the present invention.

The example in FIG. 4A shows that the defocus amounts are small in the focus state detection areas 12a, 12b, and 12c, and an object in these focus state detection areas is in a mostly in-focus state, and further the percentage of the reliability of the defocus amounts is assumed to be close to 100%. Here, if the defocus amounts of the focus state detection areas 12a, 12b, and 12c are respectively represented by def_in_12a, def_in_12b, and def_in_12c, the defocus amounts are assumed to be in the following ranges.

−0.05 mm<def_in_12a≦0.05 mm
−0.05 mm<def_in_12b≦0.05 mm
−0.05 mm<def_in_12c≦0.05 mm In this case, as the weighting coefficients for the photometry areas corresponding to the focus state detection areas 12a, 12b, and 12c, the following values can be respectively obtained from the table shown in FIG. 7A.

k(2, 4)=4
k(3, 3)=4
k(3, 5)=4

In the first embodiment, the same weighting coefficient is also applied to a predetermined number of photometry areas (here two) below each photometry area in the attitude detected by the attitude detection sensor 14 (the horizontal attitude, the clockwise vertical attitude, or the counterclockwise vertical attitude). FIG. 7B shows the range of photometry areas to which the same weighting coefficient is applied, in each of the attitudes. Assuming that a photometry area 1 corresponding to the focus state detection area used for focus adjustment processing is (x, y), the same weighting coefficient is also applied to two areas, namely, a photometry area 2 (x, y+1) and a photometry area 3 (x, y+2) in the case of the horizontal attitude. Similarly, the same weighting coefficient is applied to the photometry area 2 (x+1, y) and the photometry area 3 (x+2, y) in the case of the clockwise vertical attitude, and to the photometry area 2 (x−1, y) and the photometry area 3 (x−2, y) in the case of the counterclockwise vertical attitude. Note that the same weighting coefficient does not need to be applied to all the predetermined number of photometry areas below the photometry area corresponding to the focus state detection area, and a higher weighting coefficient may be applied to a photometry area that is closer to the photometry area corresponding to the focus state detection area, compared to the weighting coefficient applied to a farther photometry area. Further, whether to apply a lower weighting coefficient the farther a photometry area is from the photometry area corresponding to the focus state detection area or to apply the same weighting coefficient to all of such photometry areas may vary depending on the magnitude of the weighting coefficient for the photometry area serving as a reference. For example, when the weighting coefficient for the photometry area serving as a reference is lower than or equal to a predetermined value, the same weighting coefficient is applied to all of the predetermined number of photometry areas since a weighting coefficient will be excessively low if a lower weighting coefficient is applied the farther a photometry area is from the photometry area corresponding to the focus state detection area.

In the examples shown in FIGS. 4A and 4B, the same weighting coefficient is applied to the photometry area (2, 4) corresponding to the focus state detection area 12a, and the photometry areas (2, 4+1) and (2, 4+2). That is, the weighting coefficient will be as follows.

k(2, 4)=k(2, 5)=k(2, 6)=4

Similarly, in the case of the photometry areas (3, 3) and (3, 5) as well, the same weighting coefficient is applied to two photometry areas therebelow. Note that the photometry area that is two areas below the photometry area (3, 3) is the photometry area (3, 5), and thus the original weighting coefficient for the photometry area (3, 5) is given priority. That is, the weighting coefficients will be as follows.

k(3, 3)=k(3, 4)=4
k(3, 5)=k(3, 6)=k(3, 7)=4

Meanwhile, weighting coefficients for the photometry areas corresponding to the focus state detection areas 12d to 12k are also determined from the table in FIG. 7A based on the defocus amounts. Note that if the reliability of a defocus amount is less than or equal to a threshold value set in advance, a value (for example, 1) smaller than a weighting coefficient to be set in the case where the reliability is higher than the threshold value is applied as the weighting coefficient. Here, it is assumed that the absolute values of the defocus amounts of the focus state detection areas 12d to 12k are large or the reliability thereof is low, and although specific numerical values are not given here, the weighting coefficients are assumed to be 1 from the table in FIG. 7A. In this case, the weighting coefficients for the photometry areas corresponding to the focus state detection areas 12d to 12k and two photometry areas below those areas are also set to be 1. Further, a value smaller than or equal to the weighting coefficient described above, that is, for example, 1 will be applied as a weighting coefficient to the photometry areas other than the photometry areas corresponding to the focus state detection areas 12a to 12k and two photometry areas below those areas.

Note that although FIG. 4B shows an example in which the weighting coefficients for the photometry areas corresponding to the focus state detection areas 12a, 12b, and 12c are equal, the weighting coefficients for the corresponding photometry areas may differ depending on the respective defocus amounts. The example in FIG. 4C shows the weighting coefficients in the case where the absolute values of the defocus amounts of the focus state detection areas 12a, 12b, and 12c are in the relationship 12a<12b<12c, all the defocus amounts have high reliability, and the weighting coefficients for the photometry areas respectively corresponding to the focus state detection areas 12a, 12b, and 12c are 4, 3, and 2. In this case, since the same weighting coefficient is also applied to the predetermined number of photometry areas below the above areas, the weighting coefficients will be as follows.

k(2, 4)=k(2, 5)=k(2, 6)=4
k(3, 3)=k(3, 4)=3
k(3, 5)=k(3, 6)=k(3, 7)=2

Note that although the photometry area (3, 5) is included in the predetermined number of photometry areas below the photometry area (3, 3), since it is a photometry area corresponding to a focus state detection area, the original weighting coefficient is given priority.

Figures 5A, 5B:
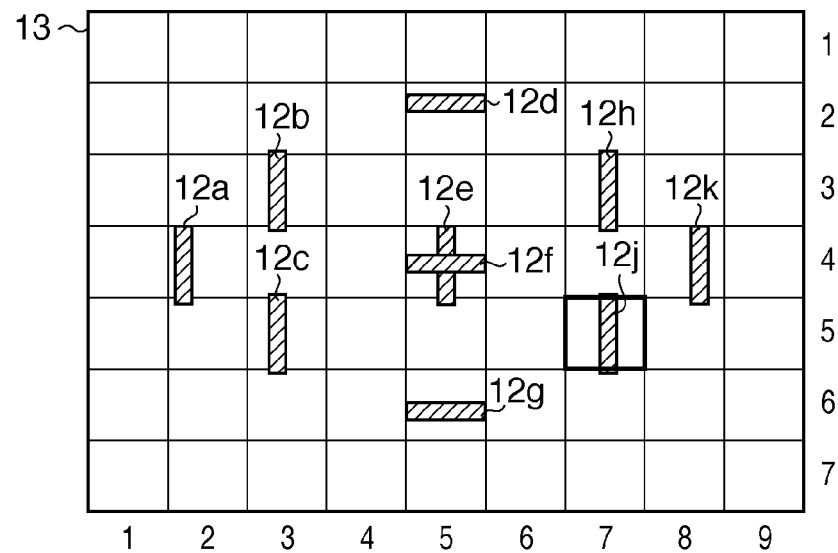
FIGS. 5A and 5B are diagrams that illustrate a procedure for determining weighting coefficients when the image sensing apparatus is in clockwise vertical attitude, according to the first embodiment.

Next is a description of a method for determining a weighting coefficient in the case where the attitude of the image sensing apparatus is the clockwise vertical attitude, with reference to FIGS. 5A and 5B. In this case, the photometry areas (9, 1) to (9, 7) are at the bottom. Further, here, it is assumed that the defocus amount of the focus state detection area $12j$ is small, which shows that an object therein is in a mostly in-focus state, and the percentage of the reliability of the defocus amount is close to 100%. Specifically, the defocus amount def_in_$12j$ of the focus state detection area $12j$ is assumed to be in the following range.

−0.05 mm<def_in_$12j$≦0.05 mm

In this case, as the weighting coefficient for the photometry area (7, 5) corresponding to the focus state detection area $12j$, the following value can be obtained from the table shown in FIG. 7A.

k(7, 5)=4

The examples shown in FIGS. 5A and 5B show the case of the clockwise vertical attitude as described above, and thus the two photometry areas below the photometry area (7, 5) are the photometry areas (8, 5) and (9, 5), as shown in FIG. 7B. The same weighting coefficient as that for the photometry area (7, 5) is also applied to these photometry areas. That is, the weighting coefficient will be as follows.

k(7, 5)=k(8, 5)=k(9, 5)=4

Weighting coefficients are also determined for the photometry areas corresponding to the focus state detection areas $12a$ to $12h$ and $12k$ from the table in FIG. 7A, based on the defocus amounts thereof. Note that if the reliability of a defocus amount is lower than or equal to the threshold value, a value (for example, 1) smaller than a weighting coefficient to be set in the case where reliability is higher than the threshold value is used as the weighting coefficient. Here, it is assumed that the defocus amounts of the focus state detection areas $12a$ to $12h$ and $12k$ are large, or the reliability thereof is low, and although specific numerical values are not given here, the weighting coefficients are assumed to be 1 from the table in FIG. 7A. In this case, the weighting coefficients for the photometry areas corresponding to the focus state detection areas $12a$ to $12h$ and $12k$ and two photometry areas below those areas are also assumed to be 1. Further, a value that is smaller than or equal to the weighting coefficient described above, that is, for example, 1 will be applied as a weighting coefficient to the photometry areas other than the photometry areas corresponding to the focus state detection areas $12a$ to $12h$ and $12k$ and two photometry areas below those areas.

Note that in the case of the counterclockwise vertical attitude as well, weighting coefficients are determined similarly, except for the top and bottom being reversed relative to the case of the clockwise vertical attitude described above with reference to FIGS. 5A and 5B.

As described above, in the first embodiment, the same value is used as a weighting coefficient for a photometry area corresponding to a focus state detection area, and a pre-set number of contiguous photometry areas below the photometry area. This is because in the case where, for example, the object is a person or the like, and a face, for instance, is in a certain focus state detection area, there is a high probability that a part of the same object such as the neck or the torso also exists in the lower area adjacent to that focus state detection area. Accordingly, photometric values of photometry areas that do not correspond to focus state detection areas can be utilized effectively by determining weighting coefficients in this way, and thereby a main object can be favorably exposed.

Second Embodiment

Figure 6A:
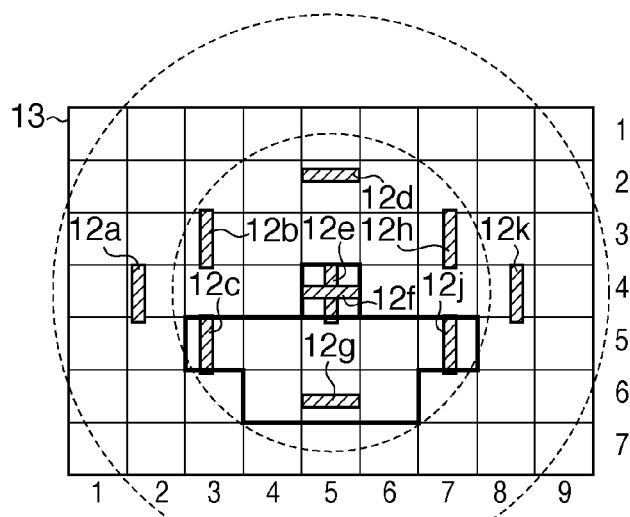
FIGS. 6A to 6C are diagrams that illustrate a procedure for determining weighting coefficients when an image sensing apparatus is in horizontal attitude, according to a second embodiment.
Figure 6B:
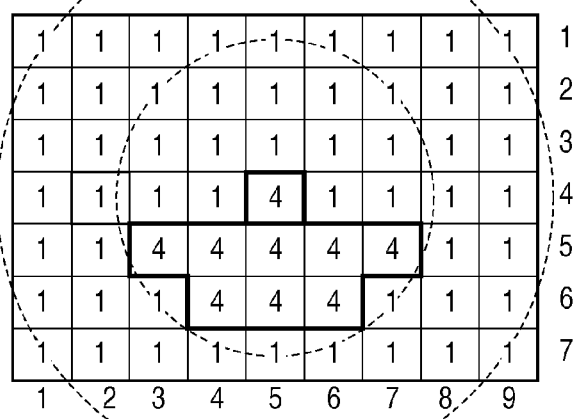
Figure 6C:
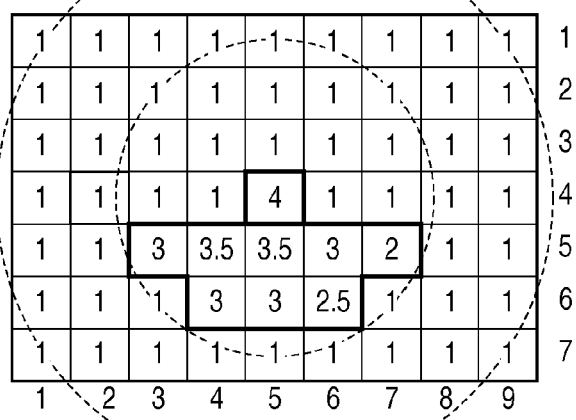

FIGS. 6A to 6C are diagrams that illustrate another procedure for determining weighting coefficients, which is performed in step S17, in the case where an image sensing apparatus is in horizontal attitude, according to a second embodiment of the present invention.

The example in FIG. 6A shows that the defocus amounts of the focus state detection areas $12a$ to $12k$ are small, an object in these focus state detection areas is in a mostly in-focus state, and the percentage of the reliability of the defocus amounts is assumed to be close to 100%. A description is now given on the case where, in the above conditions, the user selects any of the focus state detection areas or the camera automatically selects any of the focus state detection areas, from among the focus state detection areas $12a$ to $12k$. Here, the focus state detection area $12e$ is selected, and the defocus amount def_in_$12e$ of the focus state detection area $12e$ is in the following range.

−0.05 mm<def_in_$12e$≦0.05 mm

In this case, as the weighting coefficient for the photometry area (5, 4) corresponding to the focus state detection area $12e$, the following value can be obtained from the table shown in FIG. 7A.

k(5, 4)=4

Further, in the second embodiment, the same weighting coefficient as that for the photometry area (5, 4) is set for photometry areas that are in a certain radius from the photometry area (5, 4) among the photometry areas below the photometry area (5, 4). The radius from the photometry area (5, 4) for which the same weighting coefficient is set varies depending on a focal length and distance information. For example, the radius corresponds to two photometry areas may be set in the case of an imaging lens with a focal length f=50 mm, and the radius corresponds to four photometry areas may be set in the case of an imaging lens with a focal length f=300 mm. This is because since the angle of view is wider as the focal length is shorter, an object other than a main object is easily included in the image sensing screen, and therefore it is possible to suppress a too much weight being assigned to an object other than the main object, by setting a shorter radius as the focal length is shorter.

In FIGS. 6A to 6C, the inner circle shown by a dotted line shows the case where the radius corresponds to two photometry areas, and the outer circle shows the case where the radius corresponds to four photometry areas. As is clear from FIGS. 6A to 6C, in the case of an imaging lens with a focal length f=50 mm, if the central photometry area is represented by (x, y), the same weighting coefficient is set for nine photometry areas, namely, (the range of x±2, y−1) and (the range of x±1, y−2), as one group. Note that the relationship between the length of the radius and the focal length f is not limited to that described above, and can be appropriately determined depending on the size of the photometry sensor 13 or another focal length.

That is, as shown in FIGS. 6A to 6C, the weighting coefficient is as follows.

k(3, 5)=k(4, 5)=k(5, 5)=k(6, 5)=k(7, 5)
=k(4, 6)=k(5, 6)=k(6, 6)
=k(5, 4)=4

For photometry areas outside the above range, a value smaller than or equal to the weighting coefficient for the photometry areas in the above range, that is, for example, 1 is set as a weighting coefficient. Therefore, in the second embodiment, even in the case where the defocus amount obtained from a photometry area is small and the reliability thereof is high, if that photometry area is outside the radius determined based on the selected photometry area, a lower weighting coefficient is set therefor. This is because the probability that a main object exists is low in areas far from the focus state detection area selected by the user or the focus state detection area automatically selected from among a plurality of focus state detection areas by the camera using a predetermined algorithm. Accordingly, by setting weighting coefficients as described above, weighting for a main object increases, and thus favorable exposure can be obtained.

On the other hand, in the case where an object is a person or the like, and a face, for instance, is in the selected focus state detection area, there is a high probability that a part of the same object such as the neck or the torso also exists in the lower area adjacent to that focus state detection area. Accordingly, photometric values of photometry areas that do not correspond to focus state detection areas can be utilized effectively by assigning the same weighting coefficient as that for the selected photometry area to the photometry areas in the determined radius, and thus a main object can be favorably exposed.

Note that the case where the defocus amounts of the focus state detection areas that are in a certain radius from the selected focus state detection area among the focus state detection areas below that focus state detection area greatly differ from the defocus amount of the selected focus state detection area is conceivable. In such a case, it is sufficient to apply weighting to the photometry areas taking into consideration weighting coefficients based on the respective defocus amounts of the focus state detection areas. Further, it is sufficient to determine a weighting coefficient for a photometry area that does not correspond to a focus state detection area based on weighting coefficients for neighboring photometry areas that correspond to focus state detection areas.

In the example in FIG. 6C, the focus state detection area 12e is selected, and the weighting coefficient for the photometry area (5, 4) corresponding to the focus state detection area 12e is assumed to be k(5, 4)=4. The weighting coefficient for the photometry area (3, 5) that corresponds to the focus state detection area 12c and that is in a certain radius from the selected focus state detection area 12e among the focus state detection areas below the focus state detection area 12e is assumed to be k(3, 5)=3 based on the defocus amount. Similarly, the weighting coefficients for the photometry areas (5, 6) and (7, 5) that respectively correspond to the focus state detection areas 12g and 12j are assumed to be k(5, 6)=3 and k(7, 5)=2 based on the defocus amounts. At this time, the weighting coefficients for the photometry areas corresponding to the focus state detection areas are set to the respective weighting amounts obtained based on the defocus amounts. On the other hand, weighting coefficients for the photometry areas (4, 5), (5, 5), (6, 5), (4, 6), and (6, 6) that do not correspond to the focus state detection areas are determined based on the weighting coefficients for the neighboring photometry areas corresponding to the focus state detection areas. For example, the weighting coefficient for the photometry area (4, 5) is determined by referring to the weighting coefficients for the photometry areas (3, 5) and (5, 4). Since the weighting coefficient for the photometry area (3, 5) is k(3, 5)=3, and the weighting coefficient for the photometry area (5, 4) is k(5, 4)=4, the weighting coefficient for the photometry area (4, 5) is set to k(4, 5)=3.5, which is a value between the weighting coefficients for the two photometry areas. Weighting coefficients for the other photometry areas (5, 5), (6, 5), (4, 6), and (6, 6) are also determined similarly, and as a result, the weighting coefficients for all the photometry areas are as shown in FIG. 6C.

Further, a configuration may be adopted in which since it is considered that the probability that a main object exists in areas far from the selected focus state detection area is low, higher weighting coefficients are applied to photometry areas closer to the photometry area corresponding to that selected focus state detection area, compared to weighting coefficients for photometry areas far therefrom.

Note that although the case where the image sensing apparatus is in horizontal attitude has been described in the examples shown in FIGS. 6A to 6C, the same weighting coefficient may similarly be used for photometry areas that are in the radius area determined in advance and furthermore disposed below, in the case of the vertical attitude.

Next is a description of weighting coefficients in the case where the defocus amount def_in is large in each of the focus state detection areas 12a to 12k, and an object is not in an in-focus state in any of the focus state detection areas. In this case, it is assumed that the defocus amounts def_in are 0.5 mm<def_in or def_in≦−0.5 mm, for example.

In this case, irrespective of the focus state detection areas, weighting coefficients are set with emphasis on the vicinity of the center, instead of weights for the photometry areas corresponding to the focus state detection areas. In this case, all the weighting coefficients will be 1 if the table in FIG. 7A is used, and thus fixed weighting coefficients determined in advance are used, rather than using FIG. 7A. For example, weighting coefficients are set as follows.

k(5, 4)=10
k(4, 4)=k(6, 4)=k(5, 5)=k(5, 3)=7
k(3, 4)=k(7, 4)=k(5, 6)=k(5, 2)=4
k(4, 3)=k(6, 3)=k(4, 5)=k(6, 5)=4
k(j, i)=1 (for photometry areas other than the above areas)

Thus, if defocus amounts are large in all the focus state detection areas, photometric value calculation is performed in which weighting is applied, irrespective of the focus state detection areas, with emphasis on photometry areas in the vicinity of the center, instead of weighting using the defocus amounts of the focus state detection areas, which has been described above. In the case where defocus amounts are large in all the focus state detection areas, if weighting using such defocus amounts is performed, weighted calculation will be performed with respect to all the photometry areas using the same weighting coefficient, and thus even if a main object exists, exposure in consideration of that object will not be performed. However, even in the case where defocus amounts are large in all the focus state detection areas, exposure in consideration of a main object will be performed by applying weighting with emphasis on the photometry areas in the vicinity of the center where the probability that the main object exists is high.

Note that in the case where defocus amounts are large in all the focus state detection areas, photometry areas to which weighting is applied with emphasis do not need to be the photometry areas in the vicinity of the center. For example, the photometry area corresponding to the focus state detection area selected by the user may be used as a photometry area to which weighting is applied with emphasis. This is because even if defocus amounts are large in all the focus state detection areas, there are cases where the user is able to recognize the position of a main object.

Further, such weighting in the case where defocus amounts are large in all the focus state detection areas is applicable to not only the second embodiment, but also to the first embodiment. Of course, it goes without saying that the present invention is not limited to the above examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-201088, filed on Aug. 31, 2009 which is hereby incorporated by reference herein in its entirety.

What is claimed is:

1. An image sensing apparatus that has a plurality of focus state detection areas and a plurality of photometry areas, comprising:
   a defocus amount obtaining unit that obtains a defocus amount of each of the focus state detection areas;
   a photometry unit that obtains a photometric value of each of the photometry areas; and
   a determination unit that determines a weighting coefficient for each of the photometry areas,
   wherein the plurality of photometry areas includes a first photometry area that is disposed in a position corresponding to any of the plurality of focus state detection areas, and for which the weighting coefficient is determined using a defocus amount of the corresponding focus state detection area, and a second photometry area for which the weighting coefficient is determined, using the weighting coefficient for the first photometry area or the defocus amount of the focus state detection area corresponding to the first photometry area, and
   the second photometry area includes one or more photometry areas, and the number of photometry areas for obtaining photometric values in a field area that is below a first area for obtaining a photometric value in the first photometry area is greater than the number of photometry areas for obtaining photometric values in a field area that is above the first area.

2. The image sensing apparatus according to claim 1, further comprising:
   a calculation unit that performs weighted calculation using the weighting coefficients determined by the determination unit and the photometric values obtained by the photometry unit; and
   an exposure control unit that performs exposure control using a photometric value obtained by the calculation unit performing weighted calculation.

3. The image sensing apparatus according to claim 1, further comprising an attitude detection unit that detects an attitude of the image sensing apparatus,
   wherein the second photometry area is determined based on the attitude of the image sensing apparatus detected by the attitude detection unit.

4. The image sensing apparatus according to claim 1, wherein the determination unit determines, with respect to the photometry areas of the second photometry area, a smaller weighting coefficient for a photometry area that is farther from the first photometry area, compared to a weighting coefficient for a photometry area that is closer to the first photometry area.

5. The image sensing apparatus according to claim 1, further comprising a selection unit that selects the first photometry area from among a plurality of photometry areas that are each disposed in a position corresponding to any of the plurality of focus state detection areas,
   wherein the determination unit determines weighting coefficients for a plurality of photometry areas that are each disposed in a position corresponding to any of the plurality of focus state detection areas and that are not the first photometry area, using the weighting coefficient for the first photometry area or the defocus amount of the focus state detection area corresponding to the first photometry area.

6. The image sensing apparatus according to claim 5, wherein the determination unit does not determine a weighting coefficient for a photometry area, among the plurality of photometry areas that are each disposed in a position corresponding to any of the plurality of focus state detection areas and that are not the first photometry area, for obtaining a photometric value in the field area that is above the first area for obtaining a photometric value in the first photometry area, using the weighting coefficient for the first photometry area or the defocus amount of the focus state detection area corresponding to the first photometry area.

7. The image sensing apparatus according to claim 5, wherein the determination unit determines, with respect to photometry areas, among the plurality of photometry areas that are each disposed in a position corresponding to any of the plurality of focus state detection areas and that are not the first photometry area, for obtaining a photometric value in the field area that is below the first area for obtaining a photometric value in the first photometry area, a smaller weighting coefficient for a photometry area that is farther from the first photometry area, compared to a weighting coefficient for a photometry area that is closer to the first photometry area.

8. The image sensing apparatus according to claim 5, wherein the determination unit separates each photometry area, among the plurality of photometry areas that are each disposed in a position corresponding to any of the plurality of focus state detection areas and that are not the first photometry area, for obtaining a photometric value in the field area that is below the first area for obtaining a photometric value in the first photometry area, and the second photometry area into a plurality of groups according to distance from the first photometry area, and determines the same weighting coefficient for each photometry area that belongs to the same group.

9. An exposure control method for an image sensing apparatus that has a plurality of focus state detection areas and a plurality of photometry areas, the exposure control method comprising:
   a defocus amount obtaining step of obtaining a defocus amount of each of the focus state detection areas;
   a photometry step of obtaining a photometric value of each of the photometry areas; and
   a determination step of determining a weighting coefficient for each of the photometry areas,
   wherein the plurality of photometry areas includes a first photometry area that is disposed in a position corresponding to any of the plurality of focus state detection areas, and for which the weighting coefficient is determined using a defocus amount of the corresponding focus state detection area, and a second photometry area for which the weighting coefficient is determined, using the weighting coefficient for the first photometry area or the defocus amount of the focus state detection area corresponding to the first photometry area, and
   the second photometry area includes one or more photometry areas, and the number of photometry areas for obtaining photometric values in a field area that is below a first area for obtaining a photometric value in the first photometry area is greater than the number of photometry areas for obtaining photometric values in a field area that is above the first area.

10. An image sensing apparatus that has a plurality of focus state detection areas and a plurality of photometry areas, comprising:

an obtaining unit that obtains focus state information of each of the focus state detection areas;

a photometry unit that obtains a photometric value of each of the photometry areas; and a determination unit that determines a weighting coefficient for each of the photometry areas, wherein the plurality of photometry areas includes a first photometry area that is disposed in a position corresponding to any of the plurality of focus state detection areas, and for which the weighting coefficient is determined using focus state information of the corresponding focus state detection area, and a second photometry area for which the weighting coefficient is determined, using the weighting coefficient for the first photometry area or the focus state information of the focus state detection area corresponding to the first photometry area, and a size of the second photometry area for obtaining a photometric value in a field area that is below a first area for obtaining a photometric value in the first photometry area is larger than a size of the second photometry area for obtaining photometric values in a field area that is above the first area.

11. An image sensing apparatus that has a plurality of focus state detection areas and a plurality of photometry areas, comprising:

an obtaining unit that obtains a focus state information of each of the focus state detection areas;

a photometry unit that obtains a photometric value of each of the photometry areas; and a determination unit that determines a weighting coefficient for each of the photometry areas, wherein the plurality of photometry areas includes a first photometry area that is disposed in a position corresponding to any of the plurality of focus state detection areas, and for which the weighting coefficient is determined using a focus state information of the corresponding focus state detection area, and a second photometry area for which the weighting coefficient is determined, using the weighting coefficient for the first photometry area or the focus state information of the focus state detection area corresponding to the first photometry area, the second photometry area includes one or more photometry areas, and the number of second photometry areas that is below the first photometry area is greater than the number of second photometry areas that is above the first photometry area.

12. The image sensing apparatus according to claim 11, wherein the second photometry area that is below the first photometry area corresponds to a field area that is below a field area where photometry values are obtained using the first photometry area.

13. An image sensing apparatus that has a plurality of focus state detection areas and a plurality of photometry areas, comprising:

an obtaining unit that obtains a focus state information of each of the focus state detection areas;

a photometry unit that obtains a photometric value of each of the photometry areas; and a determination unit that determines a weighting coefficient for each of the photometry areas, wherein the plurality of photometry areas includes a first photometry area that is disposed in a position corresponding to any of the plurality of focus state detection areas, and for which the weighting coefficient is determined using a focus state information of the corresponding focus state detection area, and a second photometry area for which the weighting coefficient is determined, using the weighting coefficient for the first photometry area or the focus state information of the focus state detection area corresponding to the first photometry area, and a size of the second photometry area is larger on a side below the first photometry area than on a side above the first photometry area.

14. The image sensing apparatus according to claim 13, wherein the second photometry area that is below the first photometry area corresponds to a field area that is below a field area where photometry values are obtained using the first photometry area.

15. An exposure control method for an image sensing apparatus that has a plurality of focus state detection areas and a plurality of photometry areas, the exposure control method comprising:

an obtaining step of obtaining focus state information of each of the focus state detection areas;

a photometry step of obtaining a photometric value of each of the photometry areas; and a determination step of determining a weighting coefficient for each of the photometry areas, wherein the plurality of photometry areas includes a first photometry area that is disposed in a position corresponding to any of the plurality of focus state detection areas, and for which the weighting coefficient is determined using focus state information of the corresponding focus state detection area, and a second photometry area for which the weighting coefficient is determined, using the weighting coefficient for the first photometry area or the focus state information of the focus state detection area corresponding to the first photometry area, and a size of the second photometry area for obtaining a photometric value in a field area that is below a first area for obtaining a photometric value in the first photometry area is larger than a size of the second photometry area for obtaining photometric values in a field area that is above the first area.

16. An exposure control method for an image sensing apparatus that has a plurality of focus state detection areas and a plurality of photometry areas, the exposure control method comprising:

an obtaining step of obtaining focus state information of each of the focus state detection areas;

a photometry step of obtaining a photometric value of each of the photometry areas; and a determination step of determining a weighting coefficient for each of the photometry areas, wherein the plurality of photometry areas includes a first photometry area that is disposed in a position corresponding to any of the plurality of focus state detection areas, and for which the weighting coefficient is determined using focus state information of the corresponding focus state detection area, and a second photometry area for which the weighting coefficient is determined, using the weighting coefficient for the first photometry area or the focus state information of the focus state detection area corresponding to the first photometry area, the second photometry area includes one or more photometry areas, and the number of second photometry areas that is below the first photometry area is greater than the number of second photometry areas that is above the first photometry area.

17. An exposure control method for an image sensing apparatus that has a plurality of focus state detection areas and a plurality of photometry areas, the exposure control method comprising:

an obtaining step of obtaining focus state information of each of the focus state detection areas;

a photometry step of obtaining a photometric value of each of the photometry areas; and a determination step of determining a weighting coefficient for each of the photometry areas, wherein the plurality of photometry areas includes a first photometry area that is disposed in a position corresponding to any of the plurality of focus state detection areas, and for which the weighting coefficient is determined using focus state information of the corresponding focus state detection area, and a second photometry area for which the weighting coefficient is determined, using the weighting coefficient for the first photometry area or the focus state information of the focus state detection area corresponding to the first photometry area, and a size of the second photometry area is larger on a side below the first photometry area than on a side above the first photometry area.

* * * * *